US011347853B2

(12) United States Patent
Shanmugavelayutham et al.

(10) Patent No.: US 11,347,853 B2
(45) Date of Patent: *May 31, 2022

(54) HARDWARE HEURISTIC-DRIVEN BINARY TRANSLATION-BASED EXECUTION ANALYSIS FOR RETURN-ORIENTED PROGRAMMING MALWARE DETECTION

(71) Applicant: McAfee, LLC, Santa Clara, CA (US)

(72) Inventors: Palanivelrajan Rajan Shanmugavelayutham, San Jose, CA (US); Koichi Yamada, Los Gatos, CA (US); Vadim Sukhomlinov, Santa Clara, CA (US); Igor Muttik, Aylesbury (GB); Oleksandr Bazhaniuk, Hillsboro, OR (US); Yuriy Bulygin, Beaverton, OR (US); Dmitri Dima Rubakha, Santa Clara, CA (US); Jennifer Eligius Mankin, Santa Clara, CA (US); Carl D. Woodward, Santa Clara, CA (US); Sevin F. Varoglu, Santa Clara, CA (US); Dima Mirkin, Mevaseret Tzion (IL); Alex Nayshtut, Gan Yavne (IL)

(73) Assignee: MCAFEE, LLC, San Jose, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/572,277

(22) Filed: Sep. 16, 2019

(65) Prior Publication Data
US 2020/0065490 A1    Feb. 27, 2020

Related U.S. Application Data

(63) Continuation of application No. 14/923,184, filed on Oct. 26, 2015, now Pat. No. 10,437,998.

(51) Int. Cl.
  *G06F 21/56* (2013.01)

(52) U.S. Cl.
  CPC .......... *G06F 21/566* (2013.01); *G06F 21/567* (2013.01); *G06F 2221/033* (2013.01)

(58) Field of Classification Search
  CPC .... G06F 21/563; G06F 21/566; G06F 21/567; G06F 21/554; G06F 21/52; H04L 63/14; H04L 63/1416; H04L 63/1425
  See application file for complete search history.

(56) References Cited

U.S. PATENT DOCUMENTS 6,560,696 B1 * 5/2003 Hummel ............. G06F 9/30134
                                                711/109
6,704,925 B1 * 3/2004 Bugnion ............. G06F 9/45516
                                                703/26

(Continued)

FOREIGN PATENT DOCUMENTS

WO        2014152469        9/2014

OTHER PUBLICATIONS

Sun Tingtao et al, Return Instruction Analysis and Optimization in Dynamic Binary Translation, IEEE (Year: 2009).*

(Continued)

*Primary Examiner* — Shanto Abedin
(74) *Attorney, Agent, or Firm* — Hanley, Flight & Zimmerman, LLC

(57) ABSTRACT

A combination of hardware monitoring and binary translation software allow detection of return-oriented programming (ROP) exploits with low overhead and low false positive rates. Embodiments may use various forms of hardware to detect ROP exploits and indicate the presence of an anomaly to a device driver, which may collect data and pass the indication of the anomaly to the binary translation software to instrument the application code and determine whether an ROP exploit has been detected. Upon detection of the ROP exploit, the binary translation software may (Continued)

indicate the ROP exploit to an anti-malware software, which may take further remedial action as desired.

23 Claims, 10 Drawing Sheets

(56) References Cited

U.S. PATENT DOCUMENTS

| | | | | |
|---|---|---|---|---|
| 7,636,856 | B2* | 12/2009 | Gheorghescu | G06F 21/566 713/187 |
| 8,654,655 | B2 | 2/2014 | Silveira Filho et al. | |
| 9,262,627 | B2 | 2/2016 | Komaromy et al. | |
| 9,443,077 | B1 | 9/2016 | Dingle et al. | |
| 10,025,929 | B2* | 7/2018 | Sethumadhavan | G06N 20/00 |
| 2002/0010917 | A1 | 1/2002 | Srikantan et al. | |
| 2005/0108562 | A1 | 5/2005 | Khazan et al. | |
| 2005/0257099 | A1 | 11/2005 | Bounkong et al. | |
| 2009/0038008 | A1* | 2/2009 | Pike | G06F 21/52 726/22 |
| 2009/0172815 | A1 | 7/2009 | Gu et al. | |
| 2009/0328185 | A1 | 12/2009 | Berg et al. | |
| 2012/0167120 | A1 | 6/2012 | Hentunen | |
| 2014/0123281 | A1* | 5/2014 | Fischer | G06F 21/566 726/23 |
| 2014/0229717 | A1 | 8/2014 | Venkat et al. | |
| 2014/0372701 | A1* | 12/2014 | Komaromy | G06F 21/566 711/122 |
| 2015/0067763 | A1* | 3/2015 | Dalcher | G06F 21/566 726/1 |
| 2015/0278516 | A1 | 10/2015 | Caprioli | |
| 2015/0339480 | A1* | 11/2015 | Lutas | G06F 9/30058 726/22 |
| 2016/0180079 | A1 | 6/2016 | Sahita et al. | |
| 2016/0180090 | A1* | 6/2016 | Dalcher | G06F 21/554 726/23 |
| 2016/0196428 | A1* | 7/2016 | Momot | G06F 21/554 726/23 |
| 2016/0253497 | A1* | 9/2016 | Christodorescu | G06F 21/52 726/23 |
| 2016/0283714 | A1* | 9/2016 | LeMay | G06F 21/52 |
| 2016/0381043 | A1 | 12/2016 | Yamada et al. | |
| 2017/0091454 | A1* | 3/2017 | Sukhomlinov | G06F 21/566 |

OTHER PUBLICATIONS

Vasilis Pappas et al, Transparent ROP Exploit Mitigation Using Indirect Branch Tracing, Proceedings of the 22nd USENIX Security Symposium. (Year: 2013).*

Andreas Moser et al, Exploring Multiple Execution Paths for Malware Analysis, IEEE (Year: 2007).*

Zheng Shan et al, BTMD: A Framework of Binary Translation based Malcode Detector, IEEE (Year: 2012).*

Pappas et al., "Transparent ROP Exploit Mitigation using Indirect Branch Tracing," The Proceedings of the 22nd USENIX Security Symposium, Aug. 2013, pp. 447-462, 17 pages.

Patent Cooperation Treaty, "International Preliminary Report on Patentability," issued in connection with International Patent Application No. PCT/US2016/053889, dated May 1, 2018, 10 pages.

United States Patent and Trademark Office, "Non-Final Office Action," issued in connection with U.S. Appl. No. 14/923,184, dated Aug. 25, 2017, 18 pages.

United States Patent and Trademark Office, "Final Office Action," issued in connection with U.S. Appl. No. 14/923,184, dated Jun. 20, 2018, 19 pages.

United States Patent and Trademark Office, "Advisory Action," issued in connection with U.S. Appl. No. 14/923,184, dated Oct. 5, 2018, 3 pages.

United States Patent and Trademark Office, "Non-Final Office Action," issued in connection with U.S. Appl. No. 14/923,184, dated Nov. 26, 2018, 19 pages.

United States Patent and Trademark Office, "Notice of Allowance," issued in connection with U.S. Appl. No. 14/923,184, dated May 24, 2019, 13 pages.

United States Patent and Trademark Office, "Notice to File Corrected Application Papers," issued in connection with U.S. Appl. No. 14/923,184, dated Nov. 6, 2015, 2 pages.

Patent Cooperation Treaty, "Search Report and Written Opinion," issued in connection with International Patent Application No. PCT/US2016/053889, dated Jan. 11, 2017, 14 pages.

* cited by examiner

HARDWARE HEURISTIC-DRIVEN BINARY TRANSLATION-BASED EXECUTION ANALYSIS FOR RETURN-ORIENTED PROGRAMMING MALWARE DETECTION

RELATED APPLICATION

This patent arises from a continuation of U.S. patent application Ser. No. 14/923,184, (now U.S. Pat. No. 10,437, 998) which was filed on Oct. 26, 2015. U.S. patent application Ser. No. 14/932,184 is hereby incorporated herein by reference in its entirety. Priority to U.S. patent application Ser. No. 14/923,184 is hereby claimed.

TECHNICAL FIELD

Embodiments described herein generally relate to techniques for detecting malware, and more particularly to techniques for detecting return oriented programming exploits.

BACKGROUND ART

Return and jump oriented programming (ROP/JOP) exploits are a growing threat for software applications. These techniques allow an attacker to execute code even if security measures such as non-executable memory and code signing are used. In ROP, an attacker gains control of the call stack and then executes carefully chosen machine instruction sequences, called "gadgets." Each gadget typically ends in a return instruction and is code within an existing program (or library). Chained together via a sequence of carefully crafted return addresses, these gadgets allow an attacker to perform arbitrary operations. JOP attacks do not depend upon the stack for control flow, but use a dispatcher gadget to take the role of executing functional gadgets that perform primitive operations.

Detection of ROP exploits is complicated due to the nature of the attack. A number of techniques have been proposed to subvert attacks based on return-oriented programming.

The first approach is randomizing the location of program and library code, so that an attacker cannot accurately predict the location of usable gadgets. Address space layout randomization (ASLR) is an example of this approach. Unfortunately, ASLR is vulnerable to information leakage attacks and once the code location is inferred, a return-oriented programming attack can still be constructed. Randomization approach can be taken further by employing relocation at runtime. This complicates the process of finding gadgets but incurs significant overhead.

A second approach modifies the operating system with compiler support to track that return instructions actually divert control flow back to a location immediately following a call instruction. This prevents gadget chaining, but carries a heavy performance penalty. In addition, it is possible to mount JOP attacks without using return instructions at all, by using JMP instructions.

In a third approach, some Intrusion Protection Systems (IPSes) invalidate memory pages of a process except one currently executed page. Most regular jumps land within the same page. Passing control flow to a different page causes an exception that allows the IPS to check the control flow. This technique may also introduce a noticeable overhead.

Better approaches to both ROP and JOP attacks that do not incur large performance penalties would be desirable.

DESCRIPTION OF EMBODIMENTS

Figure 1:
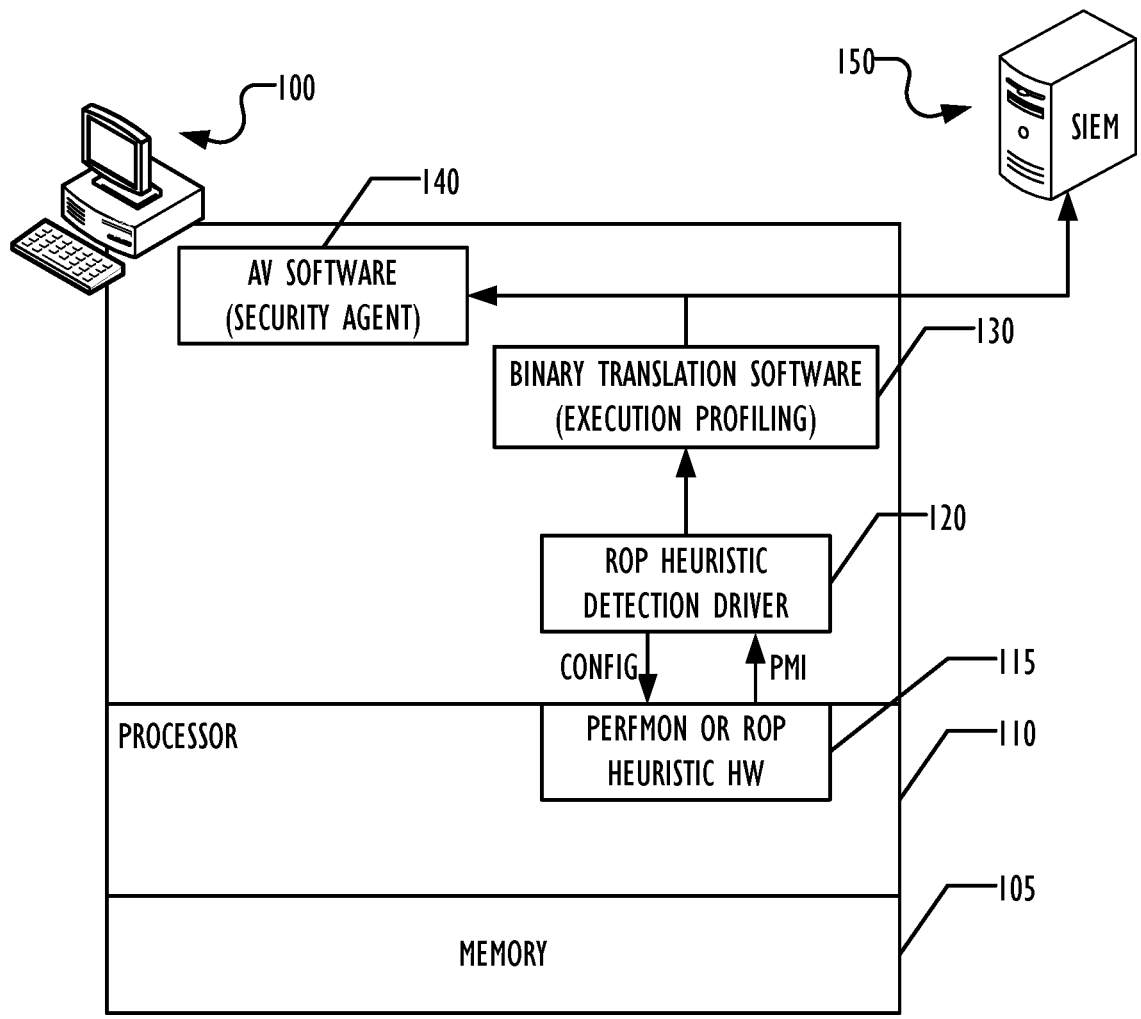
FIG. 1 is a block diagram illustrating a system implementing a combined hardware-software ROP detection technique according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, the terms "anti-virus software" and "anti-malware software" mean computer software used to prevent, detect, and remove malicious software (malware). Although not all malware is a virus, anti-virus software has evolved to provide protection from both viruses and other types of malware, and the terms have become synonymous and may be used interchangeably herein.

As used herein, the terms "processor" mean any type of computational element, such as but not limited to, a microprocessor, a processor, central processing unit (CPU), a digital signal processing unit, a multiple core processor, a mobile device processor, a desktop processor, a single core processor, a system-on-chip (SoC) device, a complex instruction set computing (CISC) microprocessor, a reduced instruction set (RISC) microprocessor, a very long instruction word (VLIW) microprocessor, or any other type of processor or processing circuit on a single chip or integrated circuit.

Over the past few years, code reuse exploit attacks such as ROP have become popular as ROP allows bypassing mitigation techniques such as Data Execution Prevention (DEP). ROP and its variants JOP and Call oriented programming (COP) are code-reuse attacks, where existing code snippets called gadgets (ending with a RET/JUMP/CALL instruction) are chained together to construct malicious computations. In the discussion below, ROP is used as representative of ROP, JOP, COP, and other variants of ROP.

To prevent the attackers from knowing the addresses of gadgets needed for a ROP attack, modern software may employ an ASLR (Address Space Layout Randomization) mitigation technique. Unfortunately, ASLR can often be bypassed via various address discovery techniques. ROP exploits also have demonstrated various successful bypass techniques against API hooking-based caller validation, which are currently employed with Microsoft's Enhanced Mitigation Experience Toolkit (EMET) and McAfee's Host Intrusion Prevention System (HIPS). As of today, no reliable defense exists for ROP malware attacks.

Tools such as Binary Translation/Instrumentation (BT) provide fine grain instruction level behavioral monitoring and have proven to be a highly accurate method for detecting ROP malware. However, despite high detection efficacy with minimum false positives for ROP exploits, BT methods are prone to creating significant runtime overheads (10-15% performance impact) during monitoring.

Other anti-ROP methods may make use of one or more processor hardware features, such as Last Branch Record (LBR), Performance Monitoring Unit (PMU), processor trace (PT), and dedicated ROP heuristic detection hardware, such as hardware that attempts to detect ROP malware through detection of an RET-CALL imbalance. These approaches are hardware based and have low overhead. They may signal to anti-malware software about situations that look like ROP attacks: suspicious branching, RET-CALL biases, rate of branch or return mispredicts, etc. Their challenges lie in 1) the need for additional software analysis to make a final accurate decision (to reduce false positive rate), and 2) a possibility of malware escape and evasions when the threshold of hardware events is set too high.

A combined solution described herein utilizes events from the processor that trigger a binary translation (BT) based method. Binary Translation will provide forward execution analysis to eliminate false positives and detect an ROP attack with high accuracy. Techniques described below provide a low overhead and high accuracy detection/prevention solution against code reuse attacks involving a chain of ROP gadgets by using heuristic hardware-based events to trigger BT code analysis for forward execution to make a final exploit detection decision.

ROP detection hardware counters are used to detect branch discrepancies such as RET/CALL bias, return mispredicts, indirect branch mispredicts, etc. to trigger the binary translation based execution-monitoring method. BT provides opcode-level execution runtime analysis after the heuristic event trigger to determine the validity of a trigger to eliminate false positive detections. These may be hardware counters that are specific to ROP detection or hardware counters that may be configured for various purposes, including ROP detection, or both. Different models of processors may deploy different types of hardware counters.

No known good solutions exist today for providing complete coverage against sophisticated code-reuse attacks involving ROP gadgets. Existing solutions like Microsoft's EMET have fundamental deficiencies and have been proven to be bypassed many times. The approach described herein is to use low-overhead hardware based heuristic events to detect execution anomalies and trigger highly effective BT analysis. This can provide high detection efficacy against ROP malware with a zero false positive rate and with low overhead. Heuristic hardware triggers allow system-wide monitoring and can detect anomalies on any software footprint, not only for single processes. Binary translation also provides low overhead false positive filtering on events, as false positive checks can be in-lined with a translated version of original code and eliminated for validated paths. In one implementation, the techniques described herein generated less than 1% application overhead with ~200 events per second to trigger BT based instruction level execution analysis. The BT may expose standardized application programming interfaces (APIs) from BT software for AV software integration, abstracting hardware differences between the hardware implementations (e.g., PMU based solutions, ROP heuristic hardware, etc.) and allowing seamless transition to new hardware enhancements.

The techniques described below work on the legacy binaries. No independent software vendor (ISV) or operating system vendor (OSV) enabling is needed. For example, some software-only solutions such as Microsoft Control Flow Guard technology require application recompiling to get a partial solution to control flow integrity checks, as well as support in both the compilers and OS.

The techniques described herein are applicable to any operating system and compiler. As the solution does not depend upon hooking and binary patching, it provides a unique and harder-to-bypass approach to protect against complex exploits.

A combination of a low-level device driver and a user-level library component allow easy security/AV software integration. The hardware implementation is abstracted, enabling solutions across different hardware implementations and allowing seamless transition to new hardware enhancements without impacting the AV software.

This invention provides a low overhead detection and prevention solution against code reuse attacks involving a chain of ROP gadgets by using heuristic hardware based events to trigger the binary translation code analysis, which provides novel instruction level forward execution checking to make a final exploit detection decision.

The following components are described below:

1) ROP Heuristic Detection Hardware Counters—constant running hardware counters to detect anomalies of branch executions such as RET/CALL bias, return mispredicts, indirect branch mispredicts, far branches, etc. When dedicated ROP heuristic hardware does not exist on a processor, a set of model specific performance monitoring (Perfmon) counters may be used.

2) ROP Heuristic (ROPh) Device Driver—configures the ROP heuristic detection hardware counters and interfaces with BT software to signal a branch anomaly event or any other kind of code flow anomaly (for example, a stack pointer modification often called stack pivoting). The discussion below is written in terms of branch anomalies as representative code flow anomalies, but the techniques described may be used for all types of code flow anomalies.

3) Binary Translation (BT) software—provides instruction level execution runtime analysis after the heuristic event and applies a variety of instruction level execution analysis methods to make a final deposition (ROP malware versus false positive).

4) AV (Anti-Virus) software—configures BT software through software interfaces (APIs). AV software receives a notification callback from BT software upon detection of malware activities and takes a security measure against the attack (ex. terminate the app).

FIG. 1 is a block diagram illustrating a system implementing a combined hardware-software ROP detection technique according to one embodiment. As illustrated, a workstation or client computer 100 incorporates a processor 110 that provides hardware counters that may be useful for ROP detection by the hardware. Although system 100 is illustrated as a desktop type computer, the hardware and software techniques described herein may be implemented in any type of programmable device, including mobile devices such as a smart phone. Although described herein generally as counters, the hardware features may be implemented in hardware in any desired way, including registers, special memory locations, etc.

A memory 105 coupled to the processor 110 may be used for storage of information related to the detection and analysis techniques described herein. The memory 105 may be connected to the processor in any desired way, including busses, point-to-point interconnects, etc. The memory may be also be used for storing instructions that when executed cause the computer 100 to execute the ROPh device driver 120, the BT software 130, and the anti-malware software 140.

One skilled in the art will recognize that other conventional elements of a computer system or other programmable device may be included in the system 100, such as a keyboard, pointing device, displays, etc.

Processor 110 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 110 may interpret and/or execute program instructions and/or process data stored in memory 105. Memory 105 may be configured in part or whole as application memory, system memory, or both. Memory 105 may include any system, device, or apparatus configured to hold and/or house one or more memory modules. Each memory module may include any system, device, or apparatus configured to retain program instructions and/or data for a period of time (e.g., computer-readable storage media). Instructions, logic, or data for configuring the operation of system 100, such as configurations of components such as the performance monitoring hardware 115, the ROPh device driver 120, the BT software 130, or anti-malware software 140 may reside in memory 105 for execution by processor 110.

While a single processor 110 is illustrated in FIG. 1, the system 100 may include multiple processors. Furthermore, processor 110 may include multiple cores or central processing units.

Memory 105 may include one or more memory modules and comprise random access memory (RAM), read only memory (ROM), programmable read only memory (PROM), programmable read-write memory, and solid-state memory. Memory 105 may also include a 2 of optical and magnetic, including solid-state storage elements, including removable media. The storage device may be a program storage device used for storage of software to control computer 100, data for use by the computer 100 (including performance monitoring configuration data), or both. The instructions for configuring the performance monitoring hardware as well as for processing PMU interrupts (PMIs) and analyzing the collected data may be provided on one or more machine readable media, used either as part of the memory 105 or for loading the instructions from the media into the memory 105. Although only a single memory 105 is illustrated in FIG. 1 for clarity, any number of memory devices, including any number of storage devices, may be provided as desired as part of the memory 105.

The computer system 100 may be any type of computing device, such as, for example, a smart phone, smart tablet, personal digital assistant (PDA), mobile Internet device, convertible tablet, notebook computer, desktop computer, server, or smart television.

Figure 2:
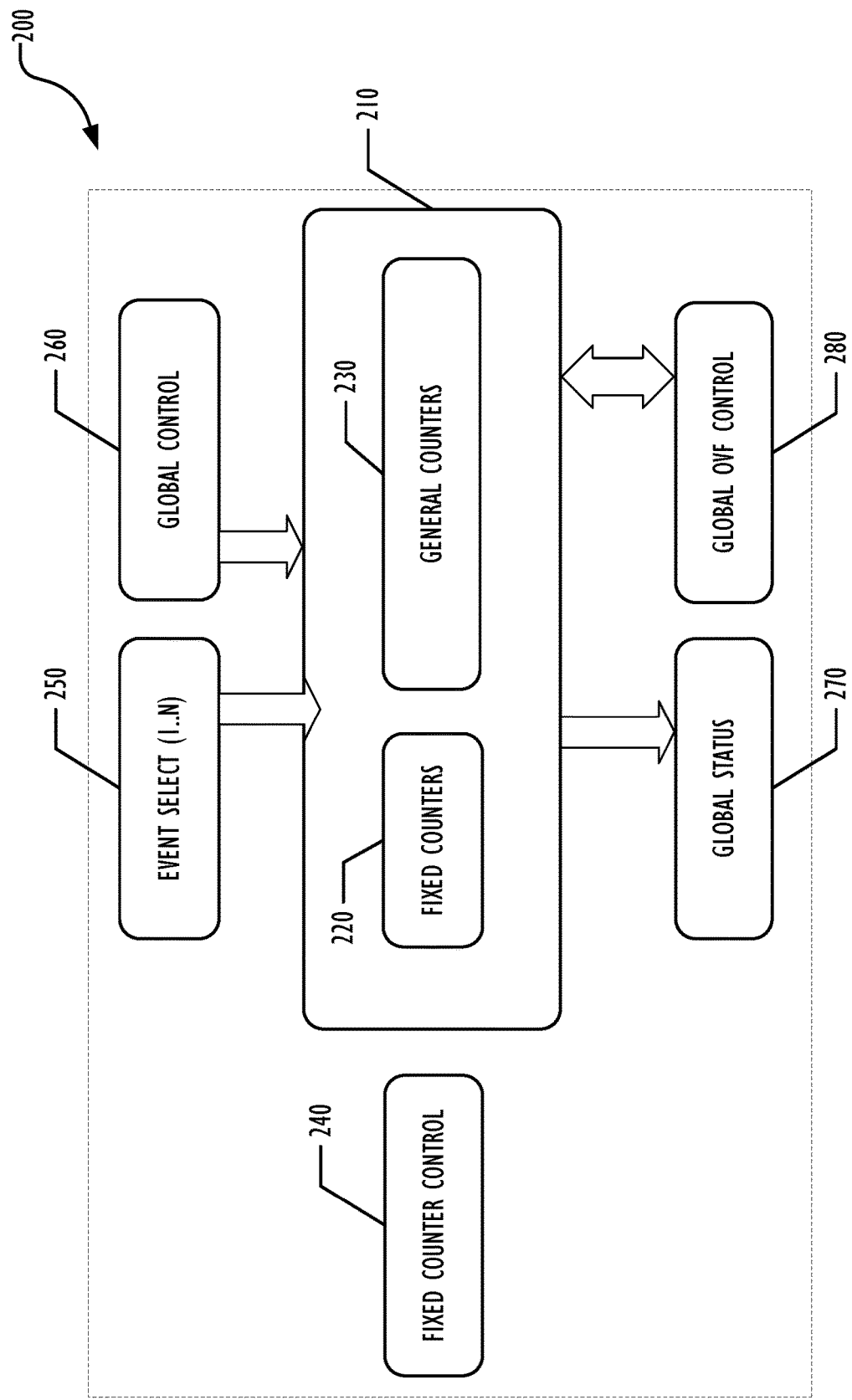
FIG. 2 is a block diagram illustrating an example of a prior art performance monitoring unit and related registers for use in the techniques described below.

For example, modern computer processors have a Performance Monitoring Unit (PMU) for monitoring selected events. The diagram in FIG. 2 illustrates the core PMU and related registers 200 on Intel x86 processors. Processors from different manufacturers may have similar PMUs, although architectural details may differ. The PMU 210 has a plurality of fixed purpose counters 220. Each fixed purpose counter 220 can count only one architectural performance event, thus simplifying the configuration part. In addition to the fixed purpose counters 220, the core PMU also supports a plurality of general purpose counters 230 that are capable of counting any activity occurring in the core. Each core PMU 210 also has a set of control registers 240, 260, to assist with programming the fixed purpose counters 220 and general purpose counters 230. The PMU 210 also has Event Select registers 250 that correspond to each fixed purpose counter 220 and general purpose counter 230, which allows for specification of the exact event that should be counted. A global control register 260 allows enabling or disabling the counters 220, 230. A global status register 270 allows software to query counter overflow conditions on combinations of fixed purpose counters 220 and general purpose counters 230. A global overflow control register 280 allows software to clear counter overflow conditions on any combination of fixed-purpose counters 220 and general purpose counters 230. The elements illustrated in FIG. 1 are illustrative and by way of example only, and other elements and arrangements of elements may be provided as desired. In a multi-core processor, each core may have its own core PMU 200; alternately, a single PMU 200 may be shared among the multiple cores.

Figure 3:
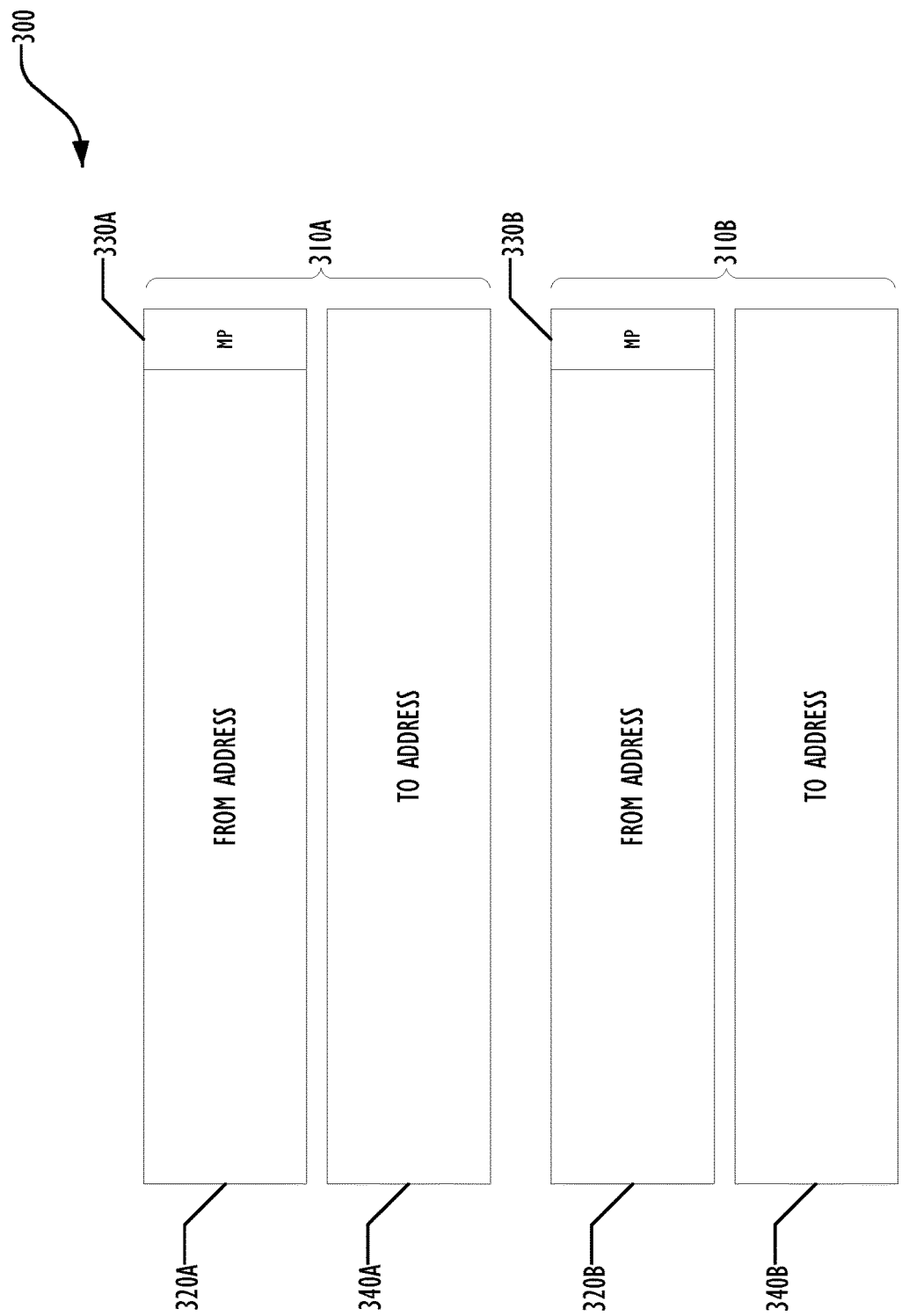
FIG. 3 is a block diagram illustrating a prior art last branch recording stack for use in the techniques described below.

Modern processor architectures also provide a branch recording mechanism. Typically, the last branch recording mechanism tracks not only branch instructions (like JMP, Jcc, LOOP, and CALL instructions), but also other operations that cause a change in the instruction pointer, like external interrupts, traps, and faults. The branch recording mechanisms generally employ a set of processor model specific registers, referred to as a last branch record (LBR) stack, each entry of which stores a source address and a destination address of the last branch, thus the LBR stack provides a record of recent branches. Some embodiments of an LBR stack may also record an indication of whether the branch was mispredicted, i.e., one or more of the target of the branch and the direction (taken, not taken) was mispredicted. In addition, control registers may allow the processor to filter which kinds of branches are to be captured in the LBR stack. FIG. 3 is a block diagram illustrating an LBR stack 300 with two sets of registers 310A and 310B in a conventional processor. Each LBR stack entry 310 includes one register with a from address field 320 and a mispredicted indicator 330, and another register with a to address field 340. Although only 2 LBR stack entries 310 are illustrated in the LBR stack 300 of FIG. 3 for clarity, implementations typically have more LBR stack entries 310. Although illustrated with the mispredict indicator as part of the register containing the from address 320, embodiments may place the mispredict indicator as part of the register containing the to address 340, or may place the mispredict indicator in a third register (not shown in FIG. 3). Other fields may be included in the LBR stack 300 as desired.

One of the ways the Event Select registers 250 may be configured is to cause the PMU 210 to count branch anomalies, such as branch mispredict events. These events may be caused by ROP exploits, as well as for other reasons. Where branch capture filtering is available, the filter may be employed to limit the captured branches to those of interest in ROP exploits. For JOP exploits, the branches of interest are typically near indirect jumps. For ROP exploits, the branches of interest are typically CALLs or RETs. However, embodiments may filter other types of branches or do no branch capture filtering, if desired. For example, COP exploits may use gadgets that end with indirect CALL instructions. In COP exploits, gadgets are chained together by pointing the memory-indirect locations to the next gadget in sequence. COP exploits may be detected using a similar approach to that used for detecting ROP exploits, with the branches of interest being CALLs.

When a mispredict event occurs (or, preferably, when a mispredict count exceeds a predetermined threshold) the reason for the misprediction may be analyzed by matching the expected program code flow with the real one extracted from the LBR stack 300. The analysis is fairly simple because the from and to addresses 320, 340 are readily available from the LBR stack 300 and the from and to addresses directly point to the code in question, allowing separating valid reasons (say, indirect CALL or deep recursion) from exploit behavior (by employing, for example, static code flow analysis of the program).

By using these facilities, embodiments disclosed herein can detect ROP exploits without significant processor overhead. Systems that include ROP-specific hardware features may similarly deploy those features for detecting ROP exploits.

Using the hardware PMU and related registers 200 and the LBR stack 300 to collect mispredicted branch data for analysis introduces the following advantages:

1. Low overhead compared to all existing methods (all events are gathered by CPU via PMU 210 and LBR stack 300).

2. Ease of analysis: LBR event data points exactly to the suspected code.

3. High ROP detection rate with an ability to fine-tune the sensitivity and minimize the false positive rate.

4. Generic to majority of processor platforms: most recent processor platforms already have all the hardware needed for implementing this invention.

5. Operating system (OS) agnostic: events collection is fully hardware-based, with no OS interaction or enablement needed.

6. Resilience to OS, Hypervisor, Basic Input/Output System (BIOS), and Unified Extensible Firmware Interface (UEFI) malware: even in the presence of an OS or firmware-based malware, events will be reliably collected and securely delivered to the monitoring agent.

7. PMU logic allows counting mispredicted RET instructions and enabling a PMI once the counter reach a predetermined threshold. This provides additional hardware-supported sensitivity control to maximize the true positive rates (fine-tuning will allow catching the smallest observed ROP shell code sequences). Not every mispredicted branch indicates an exploit. In one embodiment, the threshold value may be empirically determined, based on analysis of detected ROP exploits. In some embodiments, the threshold value may be configured based on a policy.

Similar advantages may be achieved by using ROP-specific hardware in addition to or instead of general purpose PMUs 210, in which heuristic techniques may be used to flag a potential ROP event.

In one embodiment, PMU and related registers 200 are enhanced by additional hardware elements that keep a running sum of the number of return (RET) related instructions while subtracting out the number of call (CALL) related instructions dynamically during execution. The counting is computed over some sufficiently large window for the purpose if filtering out any short term excursions in this tabulation due to legitimate nested programming behavior. A threshold may be applied to detect if this accumulated sum exceeds a designated value. In some embodiments, the designated value and the instruction window size may be controlled from by the device driver 120 under the direction of the BT software 130 or the anti-malware software 140. The controls allow for distinguishing legitimate code from abnormal behavior as possibly used by an attacker with ROP style code.

For ordinary non-ROP programs, over the long term the number of RETs generally approximately equals the number of CALLs, although the bias may be non-zero. In the case of a ROP-style program, detection would occur because the number of RETs over some window will greatly exceed the number of CALLs. When this threshold is exceeded, then the processor hardware can signal an exception that can be fielded by the device driver 120 and provided to the BT software 130 or anti-malware software 140.

Over the long term there can be a natural or legitimate imbalance between the number of RETs and number of CALLs. To address that aspect, the tabulated sum accumulated over multiple instruction windows may be biased toward zero by down-scaling the final accumulation value with each partial sum update. In one embodiment, this down-scaling can be achieved by a simple shifting of the accumulator of RETs-CALLs to the right by 1 or more bits every 'N' block of instructions. This has the effect of achieving visibility over a larger scope of execution while self-calibrating to the currently executing program context.

In addition, in one embodiment, the LBR logging capability described above may be enhanced with a freeze control. This freeze control could be activated when the ROP detect threshold mechanism is tripped, providing a backtrace of execution of where the program has been. The LBR mechanism could also be configured to filter or capture only call and return instructions. In this way the BT software 130 or AV software 140 can have a more precise picture of the last 16 (or whatever the LBR record depth support is) related CALL/RET transfers, which may more specifically identify the ROP related content. Embodiments may be configurable to enable the freeze control feature via the device driver 120.

A goal of this technology to work in a robust manner independent against future potential counter-measures that an attacker may attempt if aware of a RET instruction-based detection mechanism. Any ROP style attack must fundamentally be able to execute a program chain sequence as strung together from a series of address pointers held on the program stack.

One additional solution that may be monitored by processor hardware in one embodiment is to tabulate the number of stack related instructions and register-based control transfers for a given instruction count window, looking for cases where the two are used at an unusually high rate. For example, instead of incorporating a RET instruction, an attacker may try to exploit the equivalent code fragment: "POP reg; JMP reg" instead. This would be more difficult to utilize given the lower probability of finding this 4 byte opcode sequence versus a 1 byte RET opcode at a useful location, but not impossible.

In one embodiment, the processor hardware may apply a counting heuristic of counting "JMP reg" instances when it sees a recent higher rate of stack push or pop operations. This implies keeping track of multiple processor instruction events and applying a similar signaling to the BT software 130 or anti-malware software 140 when such control transfers that may have been associated with a variable derived from the stack. To help reduce the rate of false positives, knobs may be provided to BT software 130 or anti-malware software 140 to control the instruction count window and threshold values for both stack related operations and register based control transfers. In some embodiments adjust the values may be adjusted dynamically based on code context and a degree of trust associated with the currently running code.

As an ROP style program executes, address pointers ultimately must be popped off the stack as the program progresses, causing the stack pointer value to increase over time. This can be more generically detected by the processor keeping track of changes in the stack pointer with respect to the execution of any control transfer instruction that makes use of an indirect register value (that could have come from the stack such as "JMP reg") or references the stack directly (i.e. RET). By tabulating for each such control transfer if the stack pointer has increased, decreased, and remain unchanged, one can detect rough equivalence. For example a "RET" or equivalent "POP reg; JMP reg" may be detected roughly as a control transfer with an increasing stack pointer by at least the program counter width from the previous control transfer. Likewise a "CALL" or equivalent "PUSH reg; JMP reg" may be detected roughly as a control transfer with a decreasing stack pointer by at least the program counter width. Over a sufficiently long window, ROP-style code will see many more control transfers in which the stack point increases, while legitimate code may have other manipulations on the stack due to other variable usages, but ultimately stack space usage is bounded (assuming no memory leaks). As a result, more noise may exist for distinguishing legitimate code from ROP-style code, but through the use of hardware control knobs previously described for the window size, biasing, and threshold, embodiments may detect this usage and flag them as a branch anomaly.

One variant ROP style technique is to take advantage of stack pivot sequence code that can be naturally found in code as part of management of the stack in a separate frame for the target routine. Such stack pivot sequence code can naturally end with a restore of the stack pointer (ESP) from some other saved value prior to execution of the "RET" that retrieves the pushed instruction pointer from the original stack. Such code may end with a sequence like the following:

mov esp, eax
ret

An attacker could take advantage of this to create a gadget where they have created a ROP pointer sequence in a separate data region from the original program stack. This may be useful if the existing stack is limited in space due to some size or boundary constraints. The attack would require assembling other code via a ROP gadget to initialize register 'eax' in the example above to the attacker controller data region.

To address use of such a stack pivot sequence in one embodiment, the ROP heuristic detection hardware 115 may look for such pairing of instructions (instruction 1: stack pointer is the destination operand, instruction 2: return), and count these with additional weighting (e.g., increment the biased accumulator by 2 instead of 1) versus an ordinary non-pivoting return, on the basis that a higher frequency of stack pivoting operations is more unusual in ordinary code versus ROP-style attack code. A separate configuration control may also be provided to control the weighting for such a count.

Returning to FIG. 1, the workstation or client 100 employs hardware features 115 such as a PMU and counters 200 or ROP heuristic hardware for collecting data in hardware for use in detecting ROP exploits. The hardware features 115 may generate an interrupt, such as a performance management interrupt (PMI) to signal an ROP heuristic detection driver 120, typically implemented as part of the OS controlling the workstation 100. Any other technique for signaling a potential ROP exploit may be used, including non-interrupting signaling. The ROP heuristic driver 120 may also be used for configuring the hardware features 115. In one embodiment, the ROP heuristic detection driver 120 provides information extracted from the hardware features 115 to a BT software 130, which can perform execution profiling. If the BT software 130 determines that an ROP exploit has been detected, it may inform the AV software 140, which acts as a security agent, so that the AV software 140 may take whatever action is desired in response.

The BT software 130 and AV software 140 are illustrated in FIG. 1 as installed and executing on the workstation 100. Embodiments may allow one or more of the BT software 130 or AV software 140 to execute at least in part on other programmable devices. In one embodiment, the BT software 130 may send information about the possible exploit to a Security Information and Event Management (SIEM) system 150 that may be deployed in a remote server, for example.

In the discussion below, AV software 140, for example the McAfee Host Intrusion Prevention System, is assumed present on the target system 100 to manage the overall security policies; however, implementations may provide the AV software 140 on a separate device. The AV software 140's job is to attach the BT software 130 to the target application and configure and activate the security policy with APIs exposed by BT software 130. An appropriate level of security policy can be determined per application based upon the malware risk of the application.

The BT software 130 provides instruction level execution runtime analysis after the heuristic event and may apply a variety of instruction level execution analysis methods to make a final deposition (ROP malware versus false positive). The BT software 130 may be attached to the target application at invocation time or on demand after ROP heuristic event. The actual policy of when the BT software 130 is loaded and attached into the application may be implementation or policy specific.

The BT software 130 may expose a set of standardized APIs to the AV software 140 to configure the security policy such as an ROP detection policy and call back conditions, etc. Examples of those include low heuristic hardware thresholds for maximum protection coverage, higher thresholds for low overhead, whitelisted applications and address ranges, application specific configurations, etc. With the APIs exposed by the BT software 130, the AV software 140 can customize the ROP heuristic policy to meet specific usage models.

An ROPh device driver 120 configures the ROP heuristic hardware counters 115 and interfaces with the BT software 130 to signal a branch anomaly event. In implementations where dedicated ROP heuristic hardware counters do not exist on the processor 110, a set of model specific performance monitoring counters may be used to monitor and detect execution anomalies of branch executions. The BT software 130 may use IOCTL APIs exposed by the ROPh device driver 120 to configure the heuristic hardware configuration 115 to match with the security policy requested from the AV software 140.

When a ROP heuristic counter is equal or greater than the threshold value, the ROP heuristic hardware may generate a ROP heuristic event (an interrupt) and the ROPh Device Driver 120 may suspend the affected application and signal the event to the BT software 130. When the BT software 130 has yet to be attached to the affected application, the BT software may dynamically be loaded and attached on demand prior to receiving the ROP heuristic event. Upon receiving a ROP heuristic signal, the BT software 130 may also receive the interrupted application register state and the recorded branch history recorded by the LBR 300 of the processor from the ROPh device driver 120.

Figure 4:
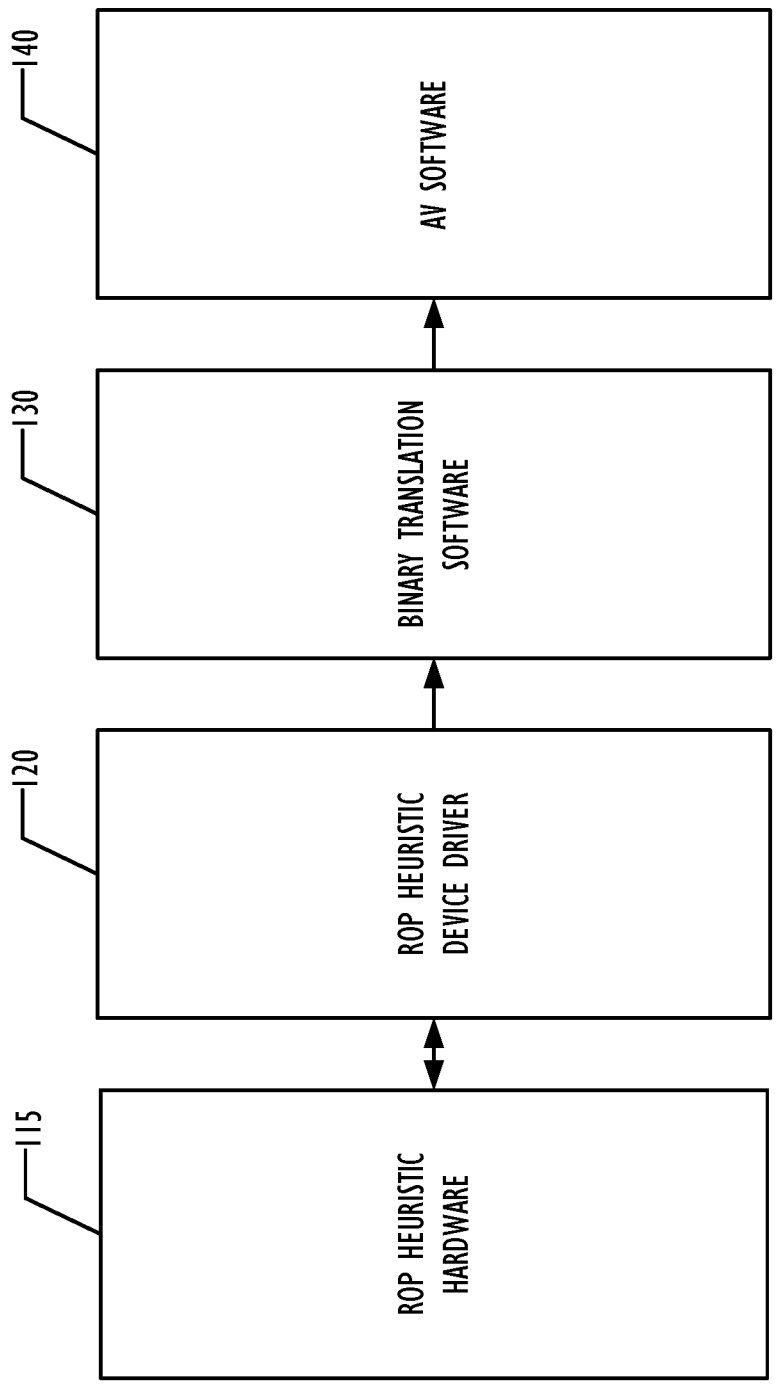
FIG. 4 is a block diagram of certain components of a system for heuristic-driven binary translation-based execution analysis for return oriented programming malware detection according to one embodiment.

Thus, an implementation according to one embodiment comprises the following components, illustrated in FIG. 4: the ROP heuristic hardware 115 (which in one embodiment includes general purpose PMU hardware 200 and LBR hardware 300); ROP heuristic device driver 120; BT software 130, and AV software 140. Details of embodiments of each are provided in FIGS. 5-8 and described below.

Figure 5:
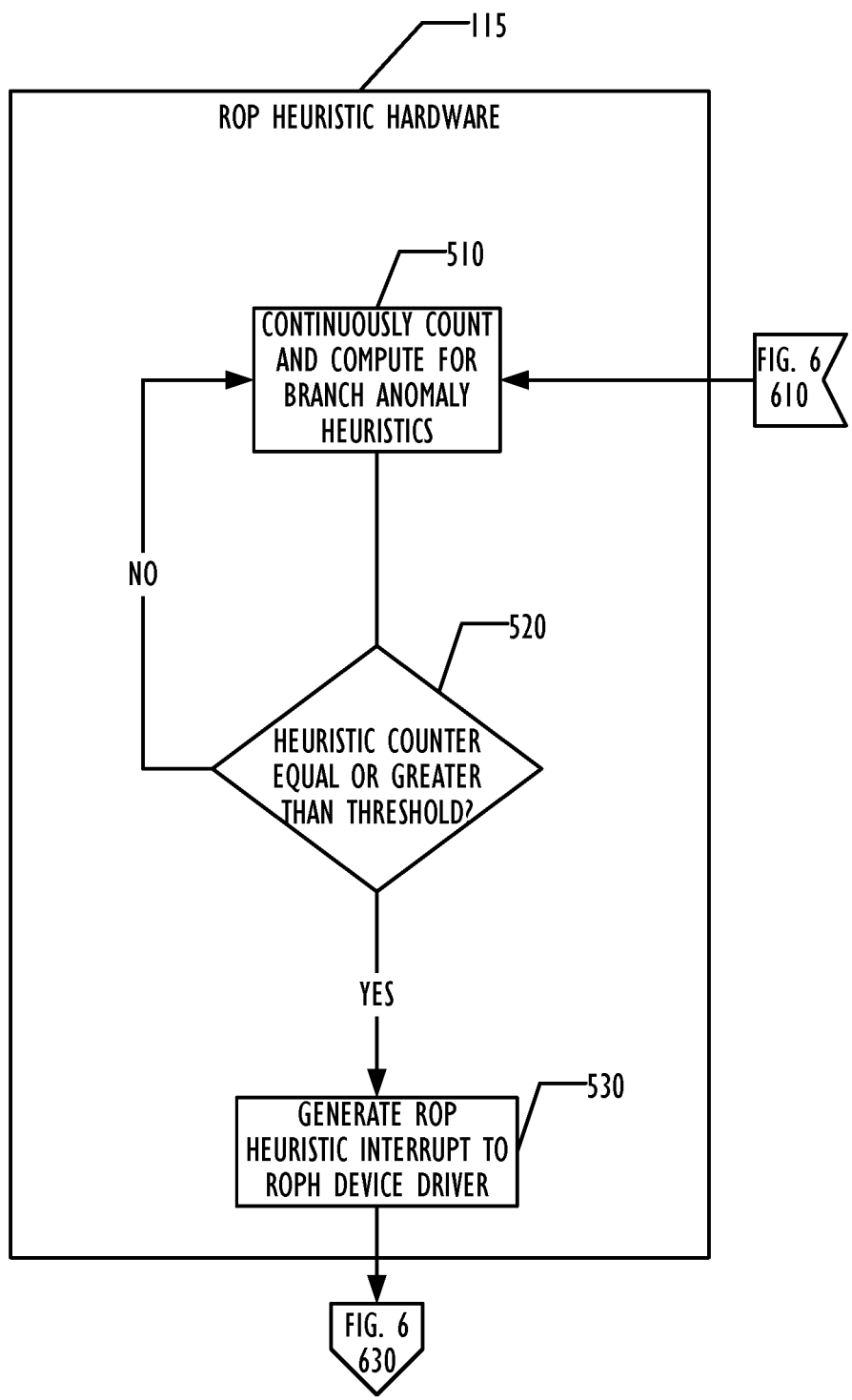
FIG. 5 is a flowchart illustrating actions taken by an ROP detection hardware according to one embodiment.

FIG. 5 is a flowchart illustrating the actions taken by the ROP detection hardware 115 according to one embodiment. In block 510, the counters (such as the PMU counters 230 of FIG. 2) continuously count branch anomalies. In some embodiments, additional computational resources may be deployed to compute for branch anomaly heuristic modeling. The counters may be configured from the ROP heuristic device driver 120, described further below with reference to FIG. 6. In block 520, the hardware determines that the counters have a predetermined relationship with a predetermined threshold value. For example, the hardware may determine whether the counter is greater than equal to the threshold value, and if so in block 530 generate an ROP heuristic interrupt to the ROP heuristic device driver. Other relationships, such as greater than, instead of greater than or equal may be used. Alternate embodiments may count down from the predetermined threshold value, detecting the event of reaching zero. Although illustrated in FIG. 5 as an interrupt fielded by the ROP device driver at block 630, any type of event signaling technology may be used.

Figure 6:
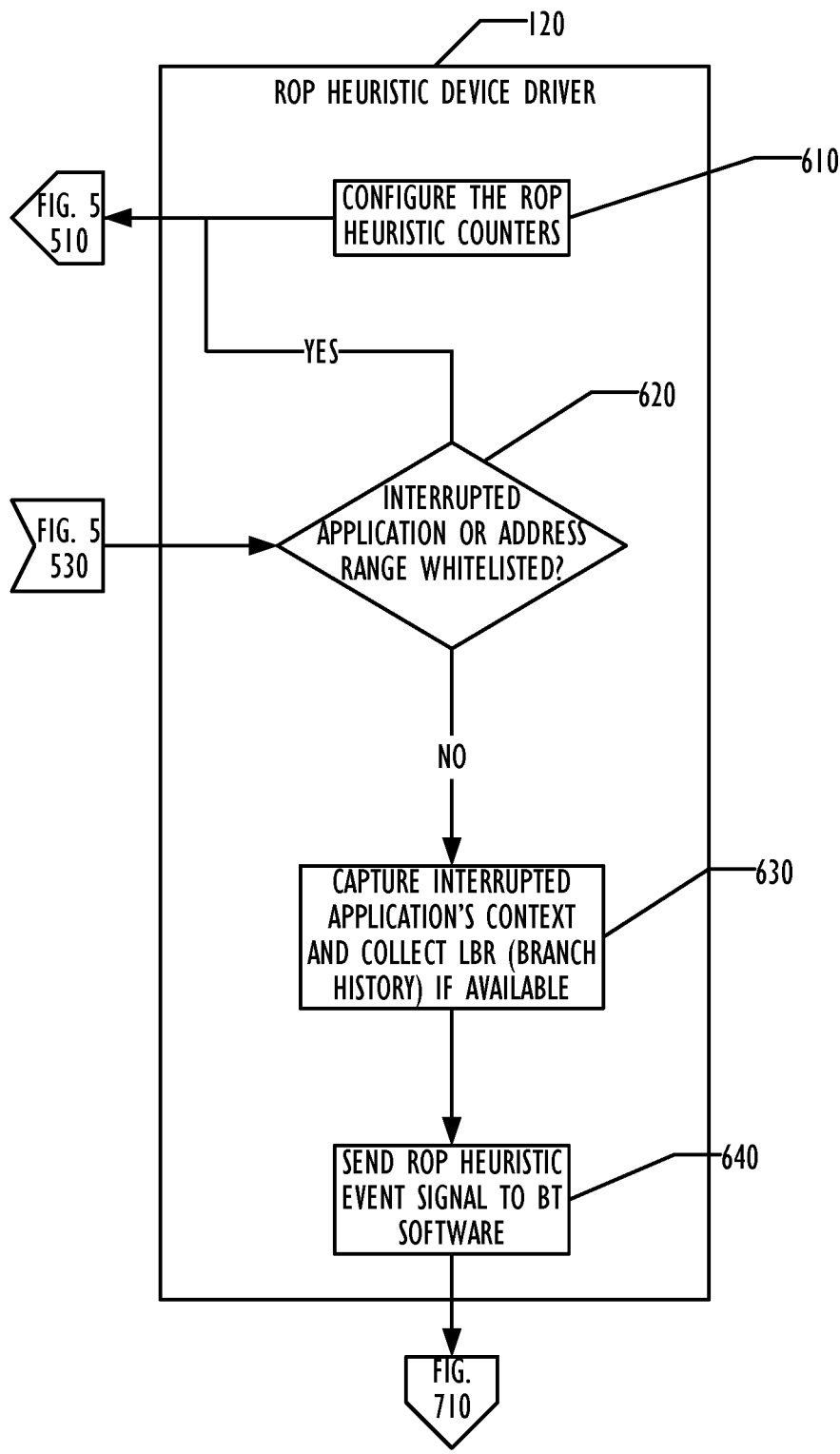
FIG. 6 is a flowchart illustrating behavior of an ROP heuristic device driver according to one embodiment.

FIG. 6 is a flowchart illustrating the behavior of an ROP heuristic device driver 120 according to one embodiment. In block 610, the device driver 120 may be used to configure the ROP detection hardware 115 as described in block 510 above. In block 620, the ROP heuristic device driver 120 receives an interrupt or other signal from the ROP detection hardware 115. In one embodiment, if the interrupt occurs during a known safe condition, for example, the interrupted application or an address range corresponding to the interrupt is listed in a whitelist, the ROP heuristic device driver 120 may configure the ROP detection hardware 115 appropriately. Any desired configuration in such a situation may be performed, such as disabling the ROP detection feature, changing the threshold value, or resetting counters in the ROP heuristic hardware 115. If the interrupt occurs while not in a known safe condition as determined in block 620, then in block 630 the ROP device driver 120 may capture or collect available information useful for the BT analysis. In one embodiment, this useful information may include information such as a context of the interrupted application such as register states, last branch record history, etc. For example, the ROP device driver 120 may read a block of memory at the address of the interrupt, read the content of the LBR stack 300, and read the content of memory pointed to by the LBR entries (from and to addresses). Any available information may be collected as desired. In some embodiments, the collected information may be stored in an ROP detection cache in memory. In other embodiments, the collected information may be written to a file in a file system. Any technique for capturing and preserving the collected information for use by the BT software 130 may be used. Any or all of the collected may be directly provided to the BT software as part of the control flow from the ROP heuristic device driver 120 or may be indirectly provided by the ROP heuristic device driver storing the information and providing access to that stored information to the BT software 130.

In block 640 the ROP heuristic device driver 120 may then signal an ROP heuristic event to the BT software 130, indicating a branch anomaly that may mean an ROP exploit has been detected. Any desired technique for signaling the BT software 130 may be used. In some embodiments, the BT software 130 may be loaded on demand and attached to the interrupted application prior to receiving the ROP heuristic event notification from the ROP heuristic device driver 120.

In some embodiments, the ROPh device driver 120 may be implemented as part of the OS kernel. However, in some embodiments, at least some of the driver 120 may be implemented in user mode. The BT software 130 is typically a user mode program, but parts of the BT software 130 may be implemented in the OS if desired.

Figure 7:
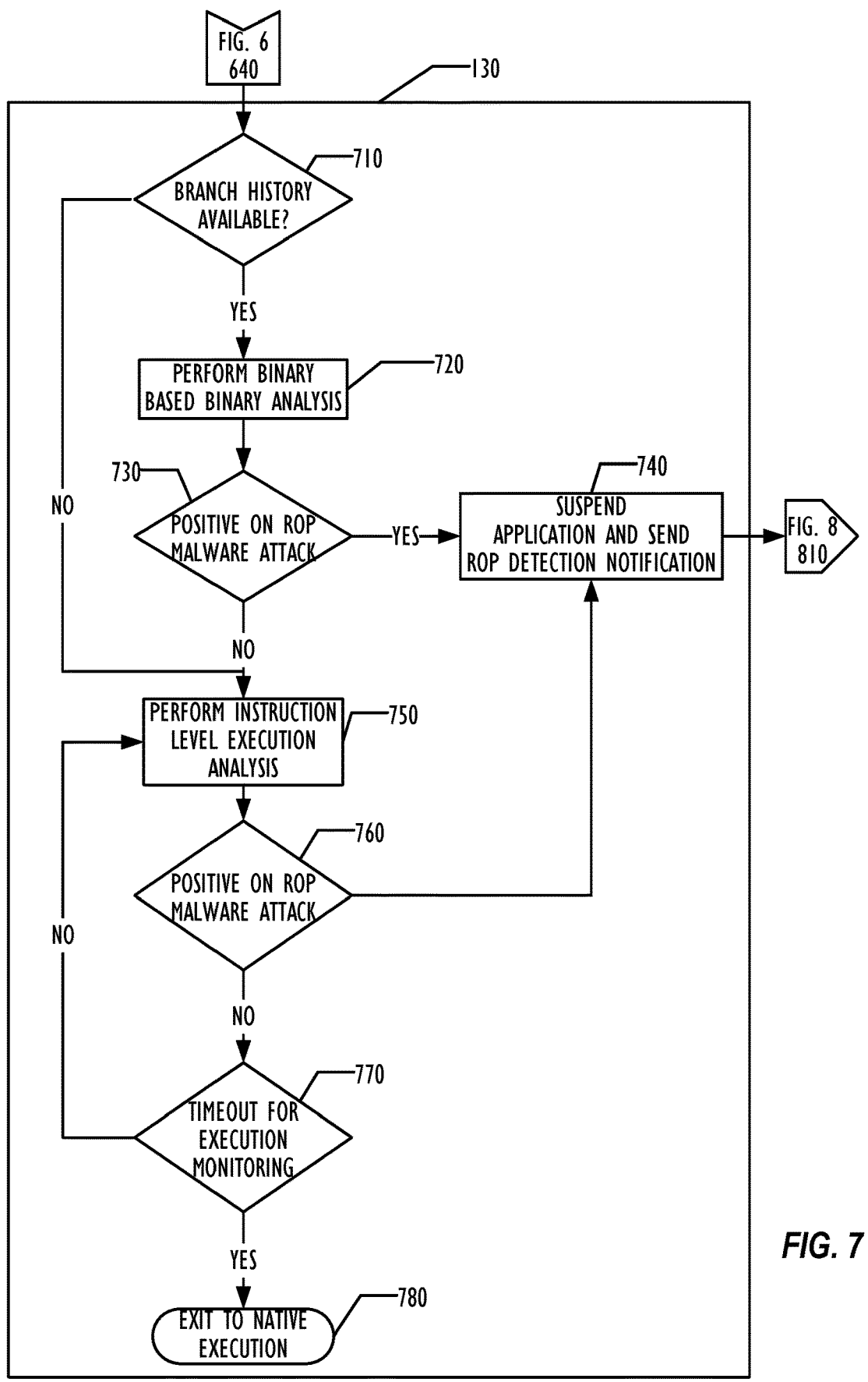
FIG. 7 is a flowchart illustrating a binary translation software according to one embodiment.

FIG. 7 is a flowchart illustrating one embodiment of the BT software 130. In block 710, upon receiving a signal from the ROPh device driver 120, the BT software 130 determines whether branch history data is available. If the branch history data is available, then in block 720 the BT software 130 performs branch history based binary analysis.

The branch history based analysis may include, for example, 1) whether the recorded RET target address has a preceding CALL instruction, 2) a check for known ROP gadget behavioral signatures (e.g., a return to critical APIs). These analyses are illustrative and by way of example only, and other branch history based analysis may be performed as desired. The recorded CALL address history may also be used for conducting CALL/RET matching during the forward execution analysis. Other types of backward code inspection may also be performed, including static code flow analysis, looking at previous LBR entries prior to the anomaly, or processor trace records.

In block 730, if the branch history based analysis can determine that the possible exploit is a malware attack, then the BT software in block 740 may suspend the affected application and notify the AV software than an ROP exploit has been detected.

When the history-based analysis is not available or is not sufficient to determine the positive-ness of malware attack, the BT software 130 may perform instruction level forward execution analysis in block 750 to make an ROP event disposition as an ROP exploit or a false positive. Instruction level execution runtime analysis may be accomplished by regenerating the binary with security check instrumentations, producing a translated version of the original binary, prior to execution. The translation is dynamically produced and may be stored into a translated cache storage on an as-needed basis by the BT software 130. Once translated, the execution of the program occurs from the translated version of the original code until there is a translation cache miss.

Instruction level forward execution analysis continuously follows the execution after the ROP heuristic event and may perform the same binary level analysis as the history based analysis listed above, applying the analysis dynamically during execution. In addition, forward execution analysis may conduct 1) dynamic branch target validation, 2) dynamic CALL/RET matching check using CALL history when available, 3) stack pivot check, 4) detection of AV evasion (hook hopping), etc.

In one embodiment, to reduce the overhead of instruction level execution analysis, the BT software 130 may generate a translated version of the original binary with in-lined security checks, thus eliminating frequent exits (context switches) to the BT software 130 for analysis. This may involve the replacement of certain instructions, such as indirect branch instructions, with stub instructions that when executed cause instrumentation code of the BT software 130 to execute. As part of translating the original binary, the target addresses of direct branch instructions may be directly incorporated into those instructions as portions of routines are placed in a translation cache. For indirect branch instructions that incorporate an identifier of their intended targets, the translation may attempt to determine the their target addresses by using those identifiers to refer to (for example) an entry point table for a library, allowing the target addresses to be retrieved. Alternately, the translation performed as part of instruction level execution analysis may retrieve indications of target addresses known to be valid from other tables, such as whitelists. One or more sizable libraries are commonly included with an operating system that may normally be stored at predictable addresses locations in storages across a variety of computing devices. Due to the reliance of what may be a great many other routines on the function routines of those libraries, those libraries typically change only very infrequently for fear of causing unforeseen and undesirable effects on the other routines that use them. Thus constructing a viable whitelist of valid target addresses for valid entry points of the function routines to which a branch instruction may validly jump becomes feasible. Where libraries are not consistently stored at predictable addresses, similar techniques may derive tables of valid addresses, such as valid entry points, once the addresses of the libraries become known. Although referred to as tables, storage of valid address information may be implemented as any of a variety of types of data structures in which indications of valid target addresses may be stored in any of a variety of formats.

If the target address derived during execution of the translated portion of the code placed in the translation cache is modified, a lookup of the target address in the tables of valid addresses may not generate a match. This may be an indication of an ROP attack. In some embodiments, both target addresses of CALL and RET instructions may be analyzed as described above, because a hallmark of ROP attacks is to modify the target addresses of return instructions as part of causing execution to jump among pieces of legitimate code to perform a malicious function.

Where an indirect branch instruction is a CALL instruction to a function routine that is expected to later be paired with a RET instruction following completion of that function routine (e.g., a function routine of a library), the BT software 130 may additionally derive the return target address of that RET instruction and store that return target address in a return look-up table as a known valid target address for that RET instruction. During normal operation, the return target address should indicate the address of the instruction immediately following the CALL instruction in whatever routine in which the CALL instruction exists. Given that the valid target address of a RET instruction that corresponds to a CALL instruction is invariably the address of whatever instruction that immediately follows that CALL instruction, it is possible to determine the valid target address of the corresponding RET instruction with certainty.

If the target of an indirect branch instruction derived during execution up to a stub instruction matches a known valid target address (however derived), then that target address to which the indirect branch instruction would direct the flow of execution is deemed to have been validated, and that indirect branch instruction may be allowed to execute. If the target address does not match, that may be considered an invalid target address, and thus may positively indicate the presence of an ROP exploit to be signaled to the AV software 140.

In some embodiments, the BT software 130 may monitor the frequency with which RET instructions occur to determine whether a ROP attack may be underway. Since ROP attacks are based on repeatedly manipulating target addresses associated with RET instructions to direct a flow of execution about portions of legitimate code to perform a malicious function, ROP often results in the frequent execution of RET instructions. Example techniques may involve repeatedly comparing the frequency with which return instructions are executed to determine whether that frequency exceeds a threshold of frequency of execution of RET instructions such that the observed use of RET instructions is deemed consistent with a ROP attack in progress. Such a threshold may be specified in any desired way, such as a number of executions of RET instructions per a specified time period or per a specified number of clock or processing cycles of the 110.

As has been discussed, it is envisioned that routines are translated a portion at a time, with each translated portion being placed in a translation cache where the processor component later executes it. The BT software 130 may further apply dynamic profiling techniques, identifying frequently executed execution paths and removing security checks for already validated paths. As a result, the instruction level execution analysis can be performed at almost original binary execution speed.

If the instruction level execution analysis determines in block 760 that an ROP attack has been detected, then in block 740 the BT software 130 may suspend the affected application and notify the AV software 140. Any desired technique for notifying the AV software 140 may be used in block 740, such as calls to an API defined by the AV software 140. Any desired collection of information may be passed from the BT software 130 to the AV software 140, including any or all of the information obtained from the hardware 115 via the device driver 120.

As illustrated in block 770, in one embodiment, after predetermined threshold condition corresponding to the forward execution analysis is provided, the BT software 130 may switch back to the native program execution in block 780 if no malware attack is detected. The predetermined threshold may be specified in any desired way, for example, a number of events, a number of blocks, a predetermined time, etc. If the threshold condition has not been reached, then the BT software 130 may continue the forward execution analysis, continuing to execute the instrumented application binary in order to try to determine whether an ROP exploit is underway.

Advanced analytics in addition may take into account additional contextual data and implement extra checks based on other factors, such as:

1. Distribution of from/to addresses.
2. Uniqueness of from, to and from/to addresses.
3. Matching of from/to addresses and other PMU counters to a distribution that characterizes the specific process (software fingerprinting).

By taking into account the address of the instruction causing the PMI (which is stored on the stack) raised by reaching threshold of counter, the BT software 130 may determine which process was responsible for the PMI, and may limit the analysis to specific monitored processes. For example, the BT software 130 may filter only addresses belonging to the address space of the monitored process. In some embodiments, the data about process location in memory is available from the OS thru Process Walking or enumerating processes. Embodiments may exclude certain processes to suppress incorrect detections or to improve system performance. The BT software 130 may analyze the time sequence of specific counters for a selected process as well as the distribution of the addresses of instructions causing those events. In addition, the distribution of branch misprediction instructions may be used to form a software fingerprint.

Figure 8:
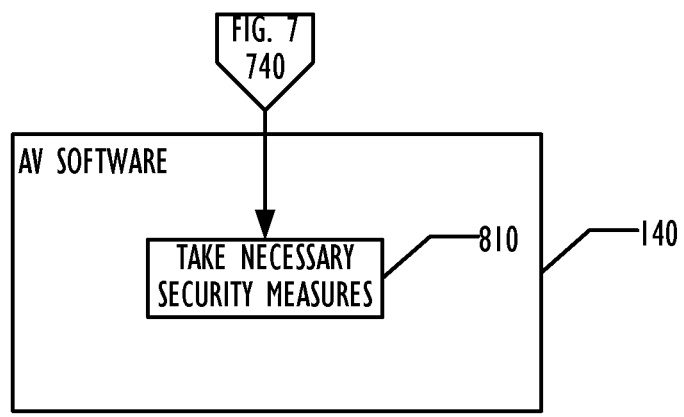
FIG. 8 is a flowchart illustrating an antimalware software according to one embodiment.

FIG. 8 is a flowchart illustrating the AV software 140 according to one embodiment. The AV software 140 in block 810 may perform further inspection based upon the reported information and decide on what actions need to be taken. For example, the AV software 140 may decide to terminate the affected application. In some cases, the AV software 140 may decide to take further security actions because of the analysis, such as disabling vulnerable software components such as plug-ins and blacklisting URLs associated with the affected application.

The anti-malware software 140 may also take subsequent actions to disposition the code in which the exploit is detected, such as terminating the process and attempting to perform a repair to remove the software from the platform, notifying a backend server of this detection, monitoring the application in a sandbox for isolation to learn more about its behavior, or if the application is legitimate, allow the program to continue after restarting execution.

Figure 9:
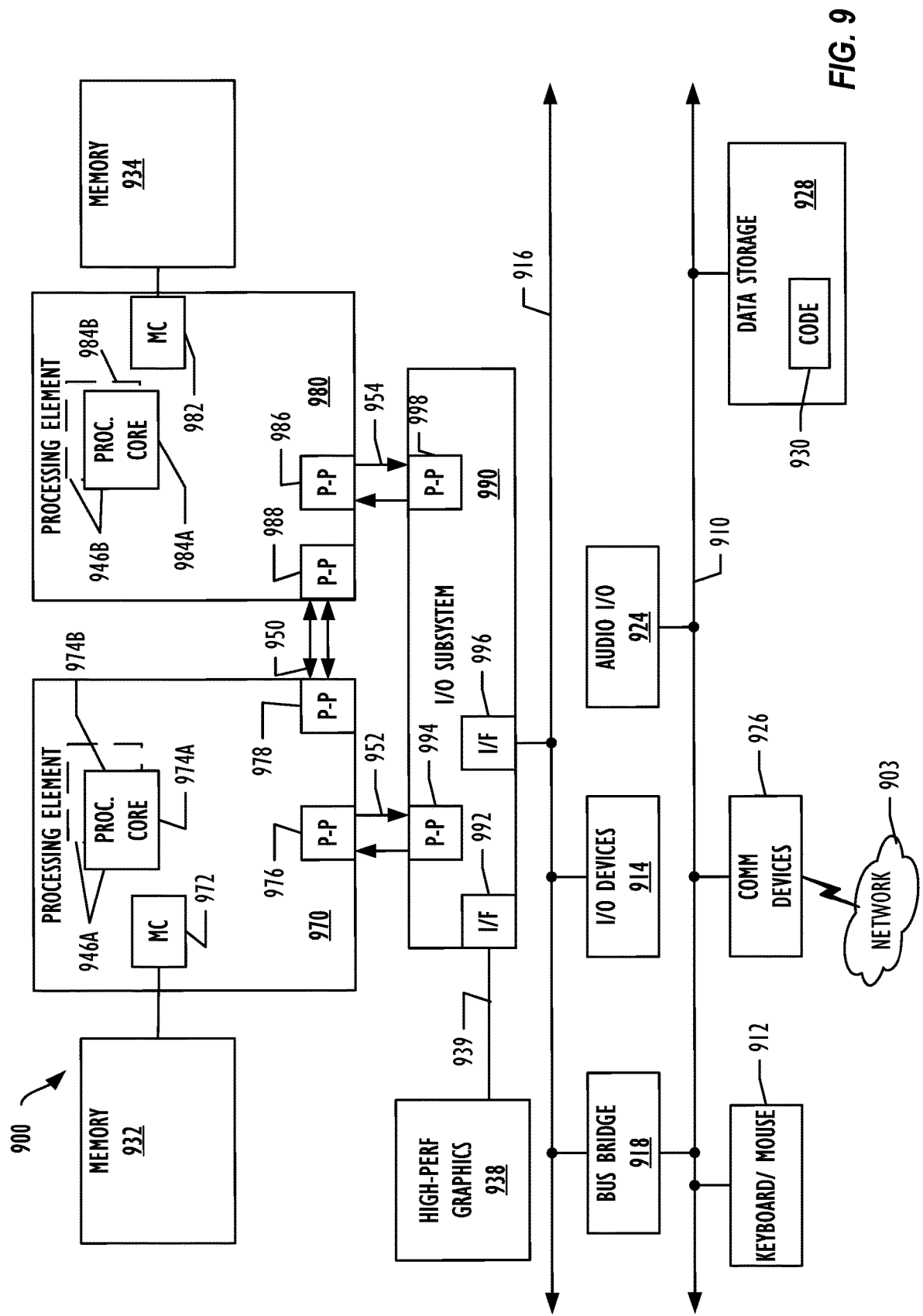
FIG. 9 is a block diagram illustrating a programmable device that may be used for implementing the techniques described herein in accordance with one embodiment.

Referring now to FIG. 9, a block diagram illustrates a programmable device 900 that may be used for implementing the techniques described herein in accordance with one embodiment. The programmable device 900 illustrated in FIG. 9 is a multiprocessor programmable device that includes a first processing element 970 and a second processing element 980. While two processing elements 970 and 980 are shown, an embodiment of programmable device 900 may also include only one such processing element.

Programmable device 900 is illustrated as a point-to-point interconnect system, in which the first processing element 970 and second processing element 980 are coupled via a point-to-point interconnect 950. Any or all of the interconnects illustrated in FIG. 9 may be implemented as a multi-drop bus rather than point-to-point interconnects.

As illustrated in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code. However, other embodiments may use processing elements that are single core processors as desired. In embodiments with multiple processing elements 970, 980, each processing element may be implemented with different numbers of cores as desired.

Each processing element 970, 980 may include at least one shared cache 946. The shared cache 946a, 946b may store data (e.g., instructions) that are utilized by one or more components of the processing element, such as the cores 974a, 974b and 984a, 984b, respectively. For example, the shared cache may locally cache data stored in a memory 932, 934 for faster access by components of the processing elements 970, 980. In one or more embodiments, the shared cache 946a, 946b may include one or more mid-level caches, such as level 2 (L2), level 3 (L3), level 4 (L4), or other levels of cache, a last level cache (LLC), or combinations thereof.

While FIG. 9 illustrates a programmable device with two processing elements 970, 980 for clarity of the drawing, the scope of the present invention is not so limited and any number of processing elements may be present. Alternatively, one or more of processing elements 970, 980 may be an element other than a processor, such as an graphics processing unit (GPU), a digital signal processing (DSP) unit, a field programmable gate array, or any other programmable processing element. Processing element 980 may be heterogeneous or asymmetric to processing element 970. There may be a variety of differences between processing elements 970, 980 in terms of a spectrum of metrics of merit including architectural, microarchitectural, thermal, power consumption characteristics, and the like. These differences may effectively manifest themselves as asymmetry and heterogeneity amongst processing elements 970, 980. In some embodiments, the various processing elements 970, 980 may reside in the same die package.

First processing element 970 may further include memory controller logic (MC) 972 and point-to-point (P-P) interconnects 976 and 978. Similarly, second processing element 980 may include a MC 982 and P-P interconnects 986 and 988. As illustrated in FIG. 9, MCs 972 and 982 couple processing elements 970, 980 to respective memories, namely a memory 932 and a memory 934, which may be portions of main memory locally attached to the respective processors. While MC logic 972 and 982 is illustrated as integrated into processing elements 970, 980, in some embodiments the memory controller logic may be discrete logic outside processing elements 970, 980 rather than integrated therein.

Processing element 970 and processing element 980 may be coupled to an I/O subsystem 990 via respective P-P interconnects 976 and 986 through links 952 and 954. As illustrated in FIG. 9, I/O subsystem 990 includes P-P interconnects 994 and 998. Furthermore, I/O subsystem 990 includes an interface 992 to couple I/O subsystem 990 with a high performance graphics engine 938. In one embodiment, a bus (not shown) may be used to couple graphics engine 938 to I/O subsystem 990. Alternately, a point-to-point interconnect 939 may couple these components.

In turn, I/O subsystem 990 may be coupled to a first link 916 via an interface 996. In one embodiment, first link 916 may be a Peripheral Component Interconnect (PCI) bus, or a bus such as a PCI Express bus or another I/O interconnect bus, although the scope of the present invention is not so limited.

As illustrated in FIG. 9, various I/O devices 914, 924 may be coupled to first link 916, along with a bridge 918 that may couple first link 916 to a second link 920. In one embodiment, second link 920 may be a low pin count (LPC) bus. Various devices may be coupled to second link 920 including, for example, a keyboard/mouse 912, communication device(s) 926 (which may in turn be in communication with the computer network 903), and a data storage unit 928 such as a disk drive or other mass storage device which may include code 930, in one embodiment. The code 930 may include instructions for performing embodiments of one or more of the techniques described above. Further, an audio I/O 924 may be coupled to second link 920.

Note that other embodiments are contemplated. For example, instead of the point-to-point architecture of FIG. 9, a system may implement a multi-drop bus or another such communication topology. Although links 916 and 920 are illustrated as busses in FIG. 9, any desired type of link may be used. In addition, the elements of FIG. 9 may alternatively be partitioned using more or fewer integrated chips than illustrated in FIG. 9.

Figure 10:
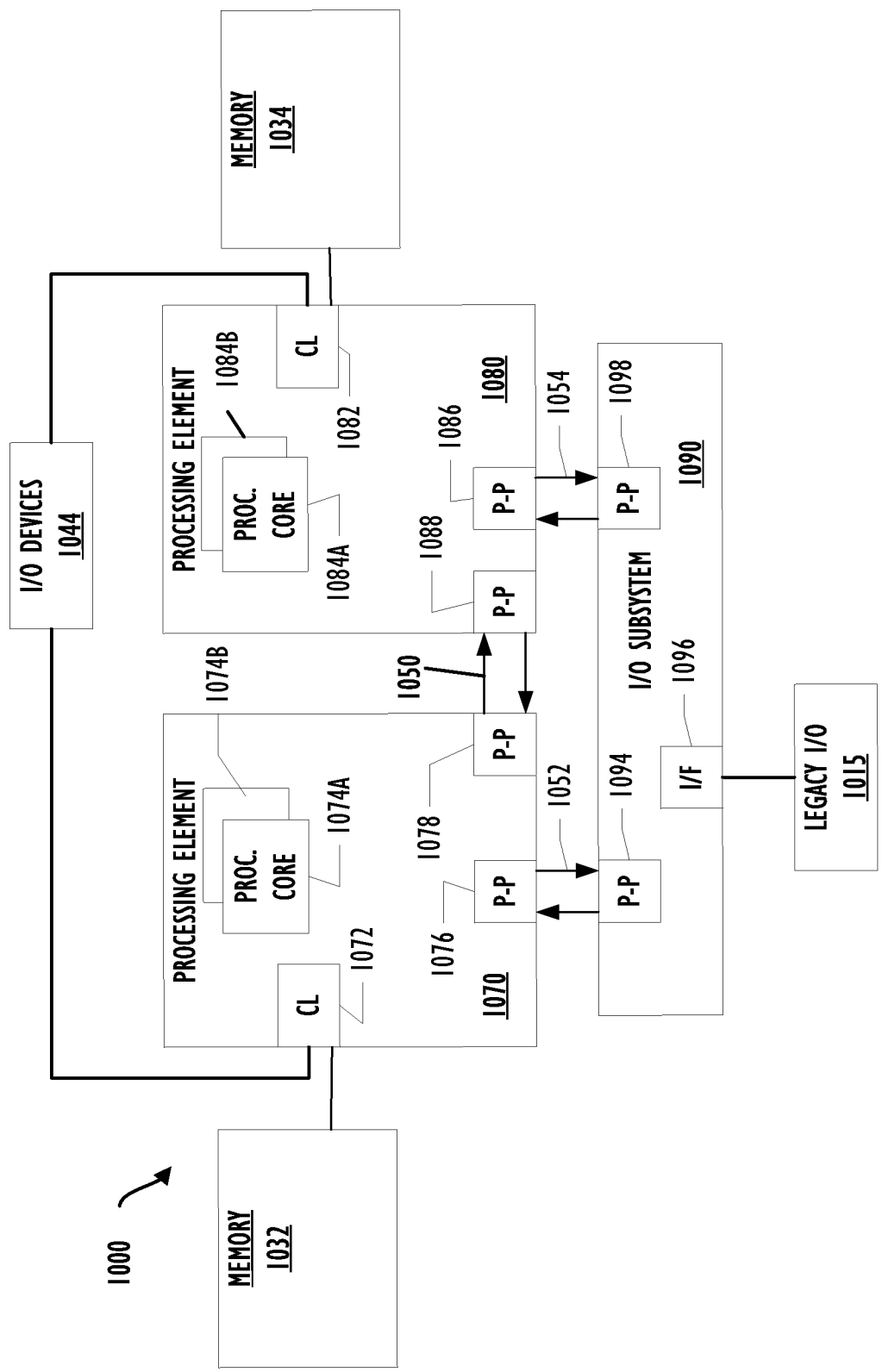
FIG. 10 is a block diagram illustrating a programmable device that may be used for implementing the techniques described herein in accordance with another embodiment.

Referring now to FIG. 10, a block diagram illustrates a programmable device 1000 according to another embodiment. Certain aspects of FIG. 10 have been omitted from FIG. 10 in order to avoid obscuring other aspects of FIG. 10.

FIG. 10 illustrates that processing elements 1070, 1080 may include integrated memory and I/O control logic ("CL") 1072 and 1082, respectively. In some embodiments, the 1072, 1082 may include memory control logic (MC) such as that described above in connection with FIG. 9. In addition, CL 1072, 1082 may also include I/O control logic. FIG. 10 illustrates that not only may the memories 1032, 1034 be coupled to the CL 1072, 1082, but also that I/O devices 1044 may also be coupled to the control logic 1072, 1082. Legacy I/O devices 1015 may be coupled to the I/O subsystem 1090 by interface 1096. Each processing element 1070, 1080 may include multiple processor cores, illustrated in FIG. 10 as processor cores 1074A, 1074B, 1084A and 1084B. As illustrated in FIG. 10, I/O subsystem 1090 includes point-to-point (P-P) interconnects 1094 and 1098 that connect to P-P interconnects 1076 and 1086 of the processing elements 1070 and 1080 with links 1052 and 1054. Processing elements 1070 and 1080 may also be interconnected by link 1050 and interconnects 1078 and 1088, respectively.

The programmable devices depicted in FIGS. 9 and 10 are schematic illustrations of embodiments of programmable devices that may be utilized to implement various embodiments discussed herein. Various components of the programmable devices depicted in FIGS. 9 and 10 may be combined in a system-on-a-chip (SoC) architecture.

The combined hardware and software techniques described above may be implemented as part of any desired type of anti-malware system, such as an intrusion protection system, to detect relatively difficult-to-detect ROP without the need for a specific signature of the exploit and with less performance impact than a purely software-based technique as has been discussed in the literature previously. Furthermore, proper design of the analytical engine may avoid the negative impact of false positives in the analysis.

The following examples pertain to further embodiments.

Example 1 is a machine readable medium, on which are stored instructions, comprising instructions that when executed cause a programmable device to: configure a processor of the programmable device to detect code flow anomalies; receive an indication of a code flow anomaly from the processor; perform binary translation of a portion of an application corresponding to the code flow anomaly; and detect a return-oriented programming exploit responsive to the binary translation.

In Example 2 the subject matter of Example 1 optionally includes wherein the instructions further comprise instructions that when executed cause the programmable device to: notify an anti-malware software of the return-oriented programming exploit.

In Example 3 the subject matter of any of Examples 1 or 2 optionally includes wherein the instructions that when executed cause the programmable device to configure the processor comprise instructions that when executed cause the programmable device to: configure a performance monitoring unit of the processor to detect mispredicted branches.

In Example 4 the subject matter of any of Examples 1 or 2 optionally includes wherein the instructions that when executed cause the programmable device to configure the processor comprise instructions that when executed cause the programmable device to: configure a return-oriented programming heuristic unit of the processor to detect code flow anomalies that indicate a possible return-oriented programming exploit.

In Example 5 the subject matter of any of Examples 1 or 2 optionally includes wherein the instructions that when executed cause the programmable device to receive an indication of a code flow anomaly from the processor comprise instructions that when executed cause the programmable device to: receive an interrupt indicating a code flow anomaly from the processor.

In Example 6 the subject matter of any of Examples 1 or 2 optionally includes wherein the instructions that when executed cause the programmable device to receive an indication of a code flow anomaly from the processor comprise instructions that when executed cause the programmable device to: receive the indication of the code flow anomaly from the processor in a device driver; collect information by the device driver corresponding to the code flow anomaly; and provide the indication of the code flow anomaly and the collected information to a binary translation module.

In Example 7 the subject matter of any of Examples 1 or 2 optionally includes wherein the instructions that when executed cause the programmable device to perform binary translation comprise instructions that when executed cause the programmable device to: analyze branch history information corresponding to the code flow anomaly;

perform forward instruction analysis; and ignore code flow anomalies that do not indicate a return-oriented programming exploit.

In Example 8 the subject matter of any of Examples 1 or 2 optionally includes wherein the instructions further comprise instructions that when executed cause the programmable device to: take an anti-malware action responsive to a determination that a return-oriented programming exploit has occurred.

Example 9 is a programmable device programmed to detect malware exploits, comprising: a processor, comprising: a code flow anomaly detector; a device driver module;

and a binary translation module, wherein the device driver module is configured to: receive an interrupt from the code flow anomaly detector; and configure the code flow anomaly detector; and notify the binary translation module of the code flow anomaly, and wherein the binary translation module is configured to: receive the notification of the code flow anomaly from the device driver module; perform binary translation of an application corresponding to the code flow anomaly; and detect a return-oriented programming exploit responsive to the binary translation.

In Example 10 the subject matter of Example 9 optionally includes wherein the code flow anomaly is a code flow anomaly indicating a possible return-oriented programming exploit.

In Example 11 the subject matter of Example 9 optionally includes further comprising: an anti-malware module, configured to: receive a notification of a return-oriented programming exploit from the binary translation software; and take an action responsive to the notification.

In Example 12 the subject matter of any of Examples 9-11 optionally includes wherein the code flow anomaly detector comprises: a performance monitoring unit, configured to detect mispredicted branches; and a last branch record unit, configured to capture information regarding branches.

In Example 13 the subject matter of any of Examples 9-11 optionally includes wherein the code flow anomaly detector comprises: heuristic-based hardware configured to detect return-oriented programming code flow anomalies.

In Example 14 the subject matter of any of Examples 9-11 optionally includes wherein the device driver module is further configured to: collect information corresponding to the code flow anomaly; and provide the collected information to the binary translation module.

In Example 15 the subject matter of any of Examples 9-11 optionally includes wherein binary translation module is further configured to suspend an application corresponding to the code flow anomaly responsive to detection of a return-oriented programming exploit.

In Example 16 the subject matter of any of Examples 9-11 optionally includes binary translation module is configured to detect a return-oriented programming exploit responsive to: analysis of a branch history corresponding to the code flow anomaly; and forward instruction analysis of code of an application associated with the code flow anomaly.

Example 17 is a method of detecting malware exploits, comprising: detecting code flow anomalies by a code flow anomaly detector unit of a processor; generating an indication of a code flow anomaly; performing binary translation of a portion of an application corresponding to the code flow anomaly; and detecting a return-oriented programming exploit responsive to the binary translation.

In Example 18 the subject matter of Example 17 optionally includes wherein detecting code flow anomalies comprises: detecting mispredicted branches.

In Example 19 the subject matter of Example 18 optionally includes wherein detecting code flow anomalies further comprises: detecting an imbalance between call and return instructions.

In Example 20 the subject matter of Example 17 optionally includes further comprising: suspending the application; and notifying an anti-malware software of the detected return-oriented programming exploit.

In Example 21 the subject matter of any of Examples 17-20 optionally includes wherein performing binary translation comprises: analyzing a branch history of the application.

In Example 22 the subject matter of any of Examples 17-20 optionally includes wherein performing binary translation comprises: performing instruction-level forward analysis of the application.

In Example 23 the subject matter of any of Examples 17-20 optionally includes further comprising: configuring the code flow anomaly detector unit by a device driver.

In Example 24 the subject matter of any of Examples 17-20 optionally includes wherein the indication of the code flow anomaly comprises an interrupt generated by the code flow anomaly detector unit.

In Example 25 the subject matter of any of Examples 17-20 optionally includes further comprising: taking an anti-malware action responsive to detecting a return-oriented programming exploit.

Example 26 is a programmable device for detecting malware, comprising: means for configuring a processor of the programmable device to detect code flow anomalies; means for receiving an indication of a code flow anomaly from the processor; means for performing binary translation of a portion of an application corresponding to the code flow anomaly; and means for detecting a return-oriented programming exploit responsive to the binary translation.

In Example 27 the subject matter of Example 26 optionally includes wherein further comprising: means for notifying an anti-malware software of the return-oriented programming exploit.

In Example 28 the subject matter of any of Examples 26 or 27 optionally includes wherein the means for configuring the processor comprise: means for configuring a performance monitoring unit of the processor to detect mispredicted branches.

In Example 29 the subject matter of any of Examples 26 or 27 optionally includes wherein the means for configuring the processor comprise: means for configuring a return-oriented programming heuristic unit of the processor to detect code flow anomalies that indicate a possible return-oriented programming exploit.

In Example 30 the subject matter of any of Examples 26 or 27 optionally includes wherein the means for receiving an indication of a code flow anomaly from the processor comprise: means for receiving an interrupt indicating a code flow anomaly from the processor.

In Example 31 the subject matter of any of Examples 26 or 27 optionally includes wherein the means for receiving an indication of a code flow anomaly from the processor comprise: means for receiving the indication of the code flow anomaly from the processor in a device driver; means for collecting information by the device driver corresponding to the code flow anomaly; and means for providing the indication of the code flow anomaly and the collected information to a binary translation module.

In Example 32 the subject matter of any of Examples 26 or 27 optionally includes wherein the means for performing binary translation comprise: means for analyzing branch history information corresponding to the code flow anomaly; means for performing forward instruction analysis; and means for ignoring code flow anomalies that do not indicate a return-oriented programming exploit.

In Example 33 the subject matter of any of Examples 26 or 27 optionally includes further comprising: means for taking an anti-malware action responsive to a determination that a return-oriented programming exploit has occurred.

Example 34 is a programmable device programmed to detect malware exploits, comprising: a processor, comprising: a code flow anomaly detector; a device driver module; and a binary translation module, wherein the device driver module is configured to: receive an interrupt from the code flow anomaly detector; and configure the code flow anomaly detector; and collect information corresponding to a code flow anomaly; provide the collected information to the binary translation module; notify the binary translation module of the code flow anomaly, and wherein the binary translation module is configured to: receive the notification of the code flow anomaly from the device driver module; perform binary translation of an application corresponding to the code flow anomaly; and detect a return-oriented programming exploit responsive to the binary translation.

In Example 35 the subject matter of Example 34 optionally includes further comprising: an anti-malware module, configured to: receive a notification of a return-oriented programming exploit from the binary translation software; and take an action responsive to the notification.

In Example 36 the subject matter of any of Examples 34-35 optionally includes wherein the code flow anomaly detector comprises: a performance monitoring unit, configured to detect mispredicted branches; and a last branch record unit, configured to capture information regarding branches.

In Example 37 the subject matter of any of Examples 34-35 optionally includes wherein the code flow anomaly detector comprises: heuristic-based hardware configured to detect return-oriented programming code flow anomalies.

In Example 38 the subject matter of any of Examples 34-35 optionally includes binary translation module is configured to detect a return-oriented programming exploit responsive to: analysis of a branch history corresponding to the code flow anomaly; and forward instruction analysis of code of an application associated with the code flow anomaly.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A programmable device to detect a malware exploit in an application, the programmable device comprising:
   hardware circuitry to:
      monitor for return related instructions and call related instructions regardless of whether a known safe operating condition is present;
      determine a first number of ones of the return related instructions;
      determine a second number of ones of the call related instructions;
      determine a difference between the second number and the first number;
      in response to the difference satisfying a threshold, detect a mispredicted branch;
      in response to a detection of the mispredicted branch, record a mispredict indicator in an entry of a last branch record stack; and
      generate an interrupt; and
   a device driver to identify a translated version of original binary in the application based on binary translation of the application in response to the interrupt.

2. The programmable device of claim 1, wherein the interrupt is to indicate a possible return-oriented programming exploit.

3. The programmable device of claim 1, wherein the hardware circuitry includes heuristic-based circuitry to determine the difference.

4. The programmable device of claim 1, wherein the device driver is to suspend the application in response to a detection of a return-oriented programming exploit.

5. The programmable device of claim 1, further including anti-malware software to take corrective action in response to a detection of a return-oriented programming exploit based on the translated version of the original binary.

6. The programmable device of claim 1, wherein the device driver is to provide collected information to enable a binary translator to perform the binary translation, the collected information including at least one of (1) a context of the application including register states of the application or (2) last branch record history corresponding to the application.

7. At least one storage device or storage disk comprising instructions that, when executed, cause one or more processors to at least:
   monitor for code flow anomalies regardless of whether a known safe operating condition is present;
   record a misprediction indicator in a register of a plurality of registers of the one or more processors based on a detection of a mismatch of an expected program code flow and one or more of the code flow anomalies;
   in response to the mismatch, generate an interrupt;
   in response to the interrupt:
      cause a binary translator to binary translate at least a portion of an application corresponding to the one or more of the code flow anomalies; and
      initiate anti-malware software to combat a return-oriented programming exploit detected in the binary translation.

8. The at least one storage device or storage disk of claim 7, wherein the instructions, when executed, cause the one or more processors to notify the anti-malware software of the return-oriented programming exploit.

9. The at least one storage device or storage disk of claim 7, wherein the instructions, when executed, cause the one or more processors to configure a hardware performance monitor circuit to detect mispredicted branches.

10. The at least one storage device or storage disk of claim 7, wherein the instructions, when executed, cause the one or more processors to configure a hardware return-oriented program heuristic circuit to detect the code flow anomalies.

11. The at least one storage device or storage disk of claim 7, wherein the instructions, when executed, cause the one or more processors to:
   analyze branch history information corresponding to the code flow anomalies;
   perform forward instruction analysis; and
   ignore code flow anomalies that do not indicate the return-oriented programming exploit based on an output of the forward instruction analysis.

12. The at least one storage device or storage disk of claim 7, wherein the instructions, when executed, cause the one or more processors to inspect the return-oriented programming exploit to determine an action to combat the return-oriented programming exploit.

13. The at least one storage device or storage disk of claim 7, wherein the instructions, when executed, cause the one or more processors to:
   identify frequently executed execution paths;
   identify ones of the identified execution paths as trusted execution paths;

remove security checks for ones of the trusted execution paths; and determine that the code flow anomalies are not associated with ones of trusted execution paths.

14. A programmable device for detecting malware, the programmable device comprising:

means for monitoring for code flow anomalies regardless of whether a known safe operating condition is present, the means for monitoring to:

detect a mispredicted branch in response to detection of a threshold number of the code flow anomalies; and record a mispredict indicator in an entry of a last branch record stack; and means for processing to:

in response to an interrupt based on the mispredict indicator:

binary translate at least a portion of an application corresponding to the code flow anomalies; and detect a return-oriented programming exploit based on the binary translation.

15. The programmable device of claim 14, wherein the interrupt is to indicate a possible return-oriented programming exploit.

16. The programmable device of claim 14, wherein the means for processing is to notify anti-malware software of the return-oriented programming exploit.

17. The programmable device of claim 14, wherein the means for processing is to configure the means for monitoring to detect the mispredicted branch based on a comparison of an expected program code flow with the code flow anomalies, the code flow anomalies extracted from the last branch record stack.

18. The programmable device of claim 14, wherein the means for processing is to configure a hardware return-oriented programming heuristic circuit of the means for monitoring to detect the code flow anomalies.

19. The programmable device of claim 14, wherein the means for processing is to:

analyze branch history information corresponding to the code flow anomalies;

perform forward instruction analysis; and ignore code flow anomalies that do not indicate the return-oriented programming exploit based on the forward instruction analysis.

20. The programmable device of claim 14, wherein the means for processing is to cause anti-malware software to take an anti-malware action in response to the return-oriented programming exploit.

21. The programmable device of claim 14, wherein the means for processing is to provide collected information to a binary translator to perform the binary translation, the collected information including at least one of (1) a context of the application including register states of the application or (2) last branch record history corresponding to the application.

22. At least one storage device or storage disk comprising instructions that, when executed, cause one or more processors to at least:

record a misprediction indicator in a register of a plurality of registers of the one or more processors based on a detection of a mismatch of an expected program code flow and one or more code flow anomalies;

in response to the mismatch, generate an interrupt;

in response to the interrupt occurring during a known safe operating condition, cause a device driver to list an address range in a trusted list, the address range associated with the interrupt;

conduct instruction level execution analysis to retrieve an indication of a target address from the trusted list;

execute a branch instruction associated with the target address; and in response to the interrupt:

cause a binary translator to binary translate at least a portion of an application corresponding to the one or more code flow anomalies; and initiate anti-malware software to combat a return-oriented programming exploit detected in the binary translation.

23. The at least one storage device or storage disk of claim 22, wherein the known safe condition includes the application or the address range to be in an approved list, a safe list, or a trusted list approved list.

* * * * *